US007345847B2

(12) United States Patent
Kikuchi et al.

(10) Patent No.: US 7,345,847 B2
(45) Date of Patent: Mar. 18, 2008

(54) TAPE CARTRIDGE

(75) Inventors: Shuichi Kikuchi, Miyagi (JP); Osamu Yamaura, Miyagi (JP); Kazuo Sasaki, Miyagi (JP); Hitomi Chiba, Miyagi (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 10/993,559

(22) Filed: Nov. 19, 2004

(65) Prior Publication Data

US 2005/0117252 A1    Jun. 2, 2005

(30) Foreign Application Priority Data

Nov. 28, 2003    (JP) .......................... P2003-398968

(51) Int. Cl.
*G11B 23/02* (2006.01)
(52) U.S. Cl. ..................................... 360/132
(58) Field of Classification Search ............... 242/342, 242/347, 348, 348.2; 360/132
See application file for complete search history.

(56) References Cited

U.S. PATENT DOCUMENTS 3,947,187 A * 3/1976 Murray, Jr. ................ 352/72
4,008,489 A * 2/1977 Gilsdorf et al. ............... 360/85
4,646,192 A * 2/1987 Droux et al. ................ 360/133
4,814,925 A * 3/1989 Beaujean .................... 360/132
4,903,153 A * 2/1990 Inoue ...................... 242/338.4
5,214,550 A * 5/1993 Chan ........................ 360/97.01
5,235,481 A * 8/1993 Kamo et al. ............. 360/97.01
5,299,754 A * 4/1994 Lackowski ................. 242/345
5,323,984 A * 6/1994 Lackowski ................. 242/348
5,986,992 A * 11/1999 Bardmesser ................ 720/652
7,124,973 B2 * 10/2006 Hiraguchi ................ 242/338.1

FOREIGN PATENT DOCUMENTS

| JP | 02220280 A | * | 9/1990 |
| JP | 05062267 A | * | 3/1993 |
| JP | 06-052651 | | 2/1994 |
| JP | 07141755 A | * | 6/1995 |
| JP | 10-241232 | | 9/1998 |
| JP | 11328943 A | * | 11/1999 |
| WO | WO 9003642 A1 | * | 4/1990 |

* cited by examiner

*Primary Examiner*—William J Klimowicz
(74) *Attorney, Agent, or Firm*—Robert J. Depke; Rockey, Depke & Lyons, LLC.

(57) ABSTRACT

A tape cartridge is configured to include a cartridge case, a hub, around which a magnetic tape is wound around and is housed in the cartridge case rotatably, and a drive apparatus for driving the hub to rotate, the drive apparatus being arranged between a bottom portion of the hub and the cartridge case.

20 Claims, 7 Drawing Sheets

TAPE CARTRIDGE

CROSS REFERENCES TO RELATED APPLICATIONS

The present invention claims priority to its priority document No. 2003-398968 filed in the Japanese Patent Office on Nov. 28, 2003, the entire contents of which being incorporated by reference herein.

BACKGROUND OF THE INVENTION

1. Field of the Invention

The present invention relates to a tape cartridge made by housing a hub rotatably, around which a magnetic tape that serves as a tape-shaped recording medium is wound, in a cartridge case, and more particularly to a tape cartridge capable of achieving stable high speed running performance of a magnetic tape and higher storage capacity of a cartridge.

2. Description of the Related Art

A magnetic tape has been conventionally used for a magnetic recording and reproducing apparatus such as an audio tape recorder, a video tape recorder or an external storage apparatus of information processing equipment as an information signal recording medium for recording an information signal, a music sound signal, an image signal and the like. The magnetic tape is used while being wound around a tape reel.

FIG. 11 shows an example of the configuration of a tape cartridge 101 of related art.

The tape cartridge 101 of related art is configured to house a tape reel 106, around which a magnetic tape 105 is wound, rotatably in a cartridge case 104 formed by connecting an upper shell 102 and a lower shell 103 to each other. The tape reel 106 includes a hub 107 that is a core portion of the magnetic tape 105, and an upper flange portion 108 and a lower flange portion 109, both extending toward outside of their diameter from the upper end and the lower end of the hub 107.

A bearing member 110, a bearing cap 111 and a reel spring 112 are placed between the tape reel 106 and the upper shell 102. The lower surface of the tape reel 106 is exposed to the outside through a circular opening portion 113 formed at the central part of the lower shell 103. A chucking gear (not shown) engaging with a gear portion 114a at the upper end of a reel driving shaft 114 on the side of a recording and reproducing apparatus in an lower surface region (the outer surface region of the bottom portion of the hub 107) of the tape reel 106 exposed through the opening portion 113 is formed in ring-shape concentrically with the hub 107.

Next, when the tape cartridge 101 of related art is mounted in the recording and reproducing apparatus, the reel driving shaft 114 rises to engage the gear portion 114a thereof with chucking gear of the tape reel 106, and the tape reel 106 is pushed up to almost the central part of the thickness direction of the cartridge case 104 against the urging force of the reel spring 112. Consequently, the tape reel 106 is made to be rotatable. Then, the rotation driving force of the reel rotating shaft 114 is transmitted to the tape reel 106 through the chucking gear to rotate the tape reel 106. Thus the unwinding/winding of the magnetic tape 105 is performed.

As the prior art document information pertaining to the invention of this application, the following documents can be cited.

[Patent Document 1] Japanese Patent Application Publication No. 55-80842
[Patent Document 2] Japanese Patent Application Publication No. 09-115265
[Patent Document 3] Japanese Patent Application Publication No. 10-241232

SUMMARY OF THE INVENTION

Now, for enabling high speed access to an information signal recorded on a magnetic tape, a magnetic tape recording and reproducing apparatus makes the magnetic tape travel at a speed (e.g. several meters/sec.) several times an ordinary running speed of a magnetic tape at the time of rewinding operation or fast forwarding operation.

In particular, in recent years, a tape cartridge capable of recording the information of several hundred giga bytes in a cartridge has been developed, and the running speed of the magnetic tape has been further speeded up for improving an access rate (e.g. several tens meters/sec.).

Because the storage capacity of a cartridge is determined by the recording density per unit area of a recording medium and the length of a tape wound around a tape reel provided that the width of the tape is constant, the higher storage capacity can be achieved by minimizing the inside diameter of a reel, and by maximizing the outside diameter of the reel.

As described above, when the increase of the running speed of a magnetic tape has been advanced, that is to say, when the increase of the rotation speed of a tape reel has been advanced, for improving the access rate, very high accuracy at the time of the rotation of the tape reel is required.

For example, problems such as shaft vibration of the core portion of a tape (hub), and surface vibration and circumference vibration of a flange portion become apparent as the rotation speed of a reel increases. Accordingly, it becomes difficult to perform winding operation and forwarding operation of a magnetic tape stably.

Consequently, the tape cartridge 101 of related art having the above-mentioned configuration transmits a driving force by engaging operation between the chucking gear on the lower surface of the tape reel 106 and the gear portion 114a of the reel driving shaft 114, and thereby rotates the tape reel 106. Hence, owing to the shaft vibration, the surface vibration, the circumference vibration and the like of a tape reel exerted due to a shift between the axial center positions of the tape reel and the reel driving shaft, and due to variants in engagement condition between the tape reel and the reel driving shaft, it becomes difficult to secure the stable high speed running performance of a magnetic tape.

Moreover, it is desirable to design the apparatus so as to form a margin space between the outer periphery of the reel and the inner wall portion of the cartridge case with an amount corresponding to the variants so that contact between the outer periphery of the reel and the inner wall portion of the cartridge case caused by shaft vibrations, surface vibrations, circumference vibrations or the like of the tape reel may be avoided. This necessity causes downsizing of the diameter of the outer periphery of the reel, and such a downsizing shortens the length of the tape according to the degree of the miniaturized diameter. As a result, it becomes difficult to increase the storage capacity of the cartridge.

It is desirable to provide a tape cartridge capable of securing stable high speed running performance of a magnetic tape to improve an access rate thereof, and of achieving a higher storage capacity by increasing a quantity of a tape that can be wound. The present invention was made in view of the above-mentioned situation.

According to an embodiment of the present invention, there is provided a tape cartridge including a cartridge case, a hub, around which a magnetic tape is wound around and is housed in the cartridge case rotatably, and a drive apparatus for driving the hub to rotate, the drive apparatus being arranged between a bottom portion of the hub and the cartridge case.

As described above, the tape cartridge of the present embodiment is configured to include the drive apparatus for driving the hub to rotate in the cartridge case, and enables to run the magnetic tape by itself within the cartridge.

Accordingly, a recording and reproducing apparatus would not require a reel driving shaft, the above-mentioned problems of the shaft vibrations of the hub and the surface vibrations and the circumference vibrations of the reel flanges, all resulting from the variants of relative positions between the side of the tape cartridge and the side of the recording and reproducing apparatus, and the engagement variants of the rotation driving force transmitting system may be fundamentally solved.

According to the present embodiment, the stable high speed running performance of a magnetic tape may be ensured and the access rate thereof may be achieved, and the winding diameter of the magnetic tape may be expanded to a maximum degree to enable the higher recording capacity.

The word "hub" in the present specification means the core portion of a magnetic tape. An embodiment configured by only the core portion may be included in the scope of the present invention, and an embodiment as a reel (tape reel) equipped with flanges formed to extend to the outside of the diameter from the upper end and/or the lower end of the core portion may also be within the scope of the present invention.

Moreover, the driving power source of the drive apparatus of the present embodiment may be built in the cartridge case, or may be supplied from, for example, a recording and reproducing apparatus or the like through a terminal member provide on the outer surface of the cartridge case. Moreover, a drive control signal for driving the drive apparatus through the terminal member may also be supplied.

Preferably, the drive apparatus includes a motor substrate connected with the cartridge case integrally, and a motor supported by the motor substrate, and the rotation portion of the motor is integrally connected at the center of the bottom portion of the hub. According to the configuration, the hub, which the magnetic tape is wound around, may be stably rotated in the inner part of the cartridge case. In particular, by configuring the motor by use of a flat spindle motor, the thickness of the cartridge may be reduced.

As mentioned above, the tape cartridge of the present embodiment includes a cartridge case, a hub housed in the cartridge case rotatably, which hub a magnetic tape is wound around, and a drive apparatus arranged between the bottom portion of the hub and the cartridge case for driving the hub to rotate. Because the tape cartridge is configured to perform the self running of the magnetic tape by the cartridge, the tape cartridge may be able to remove the shaft vibrations of the hub and the surface vibrations and the circumference vibrations of the reel flanges, all resulting from the position variants of the tape cartridge with the side of the recording and reproducing apparatus and the engagement variants with the rotation driving force transmitting system, and thereby the stable high speed running performance of the magnetic tape is secured and enables the improvement of an access rate, and further the winding diameter of the magnetic tape may be expanded to the maximum degree to achieve the higher recording capacity.

BRIEF DESCRIPTION OF THE DRAWINGS

The above and other objects, features and advantages of the present invention will become more apparent from the following description of the presently exemplary embodiment of the invention taken in conjunction with the accompanying drawings, in which.

DETAILED DESCRIPTION OF THE EMBODIMENTS

Below, embodiments of the present invention are described with reference to the attached drawings.

First Embodiment

FIGS. 1-5 show a first embodiment of the present invention.

Figure 1:
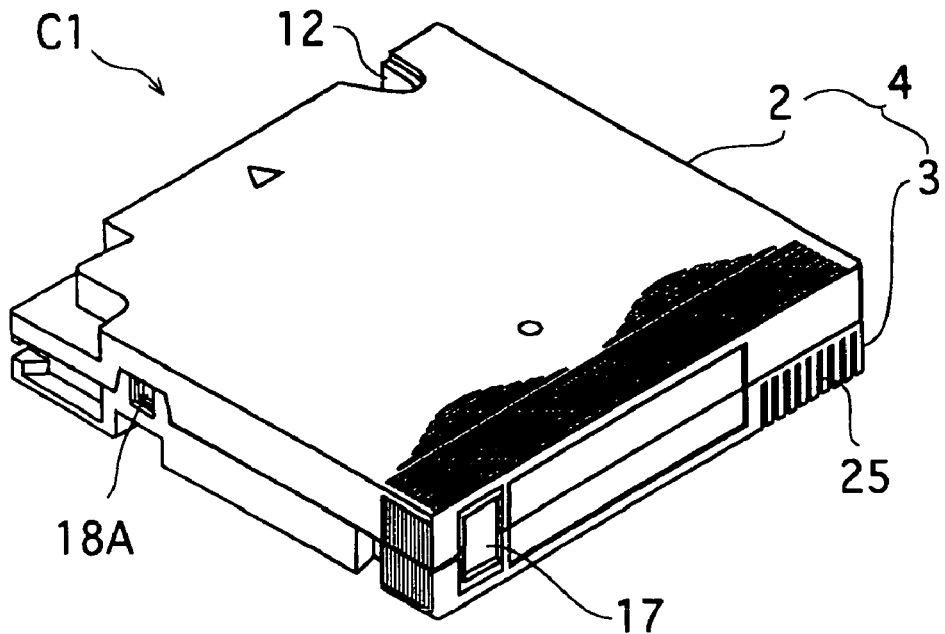
FIG. 1 is a perspective view of a tape cartridge C1 according to a first embodiment of the present invention when it is seen from the side of an upper shell 2.
Figure 2:
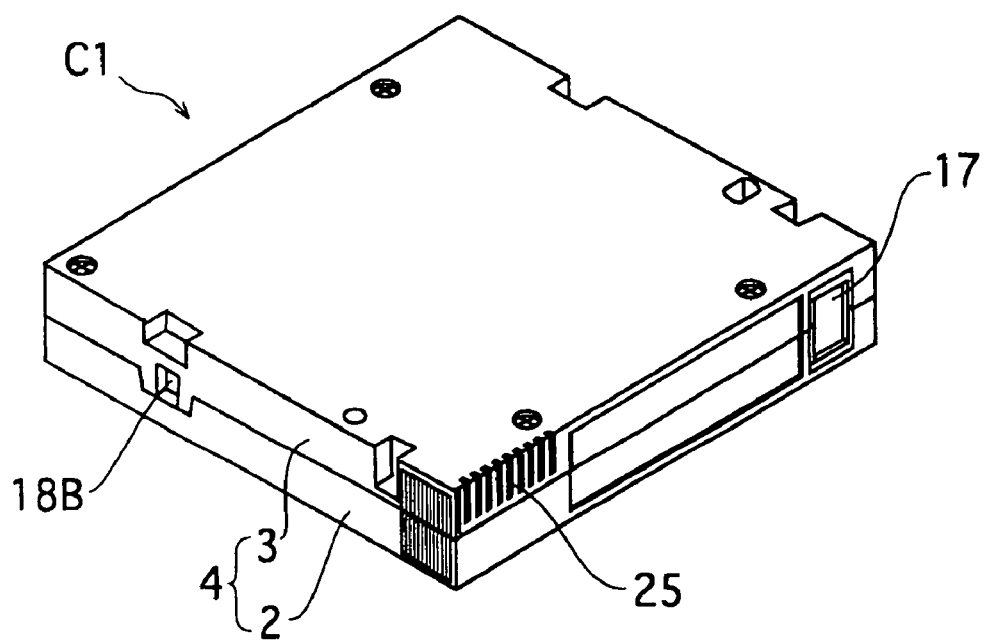
FIG. 2 is a perspective view of the tape cartridge C1 when it is seen from the side of a lower shell 3.
Figure 3:
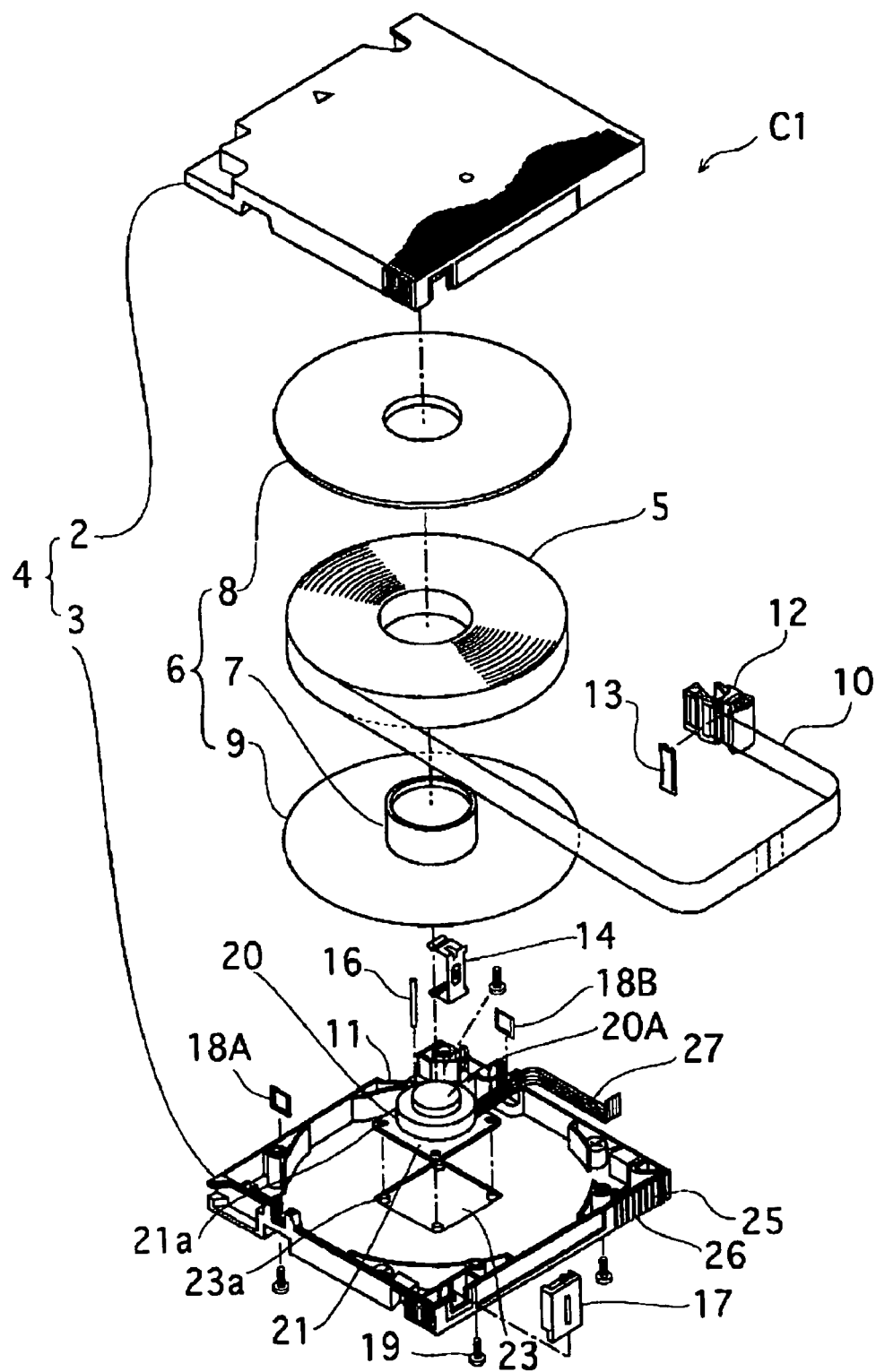
FIG. 3 is an exploded perspective view of a tape cartridge C1.
Figure 4:
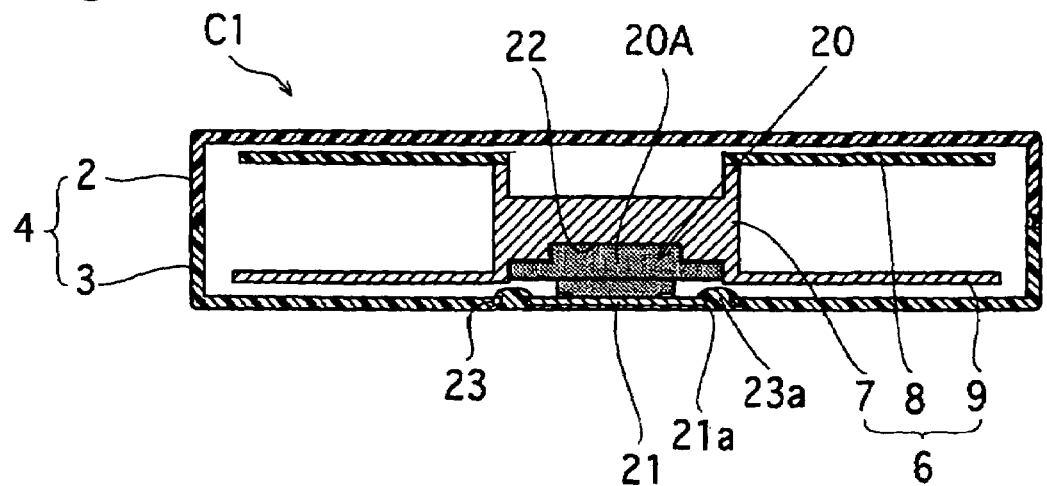
FIG. 4 is a sectional side view of a tape cartridge C1.
Figure 5:
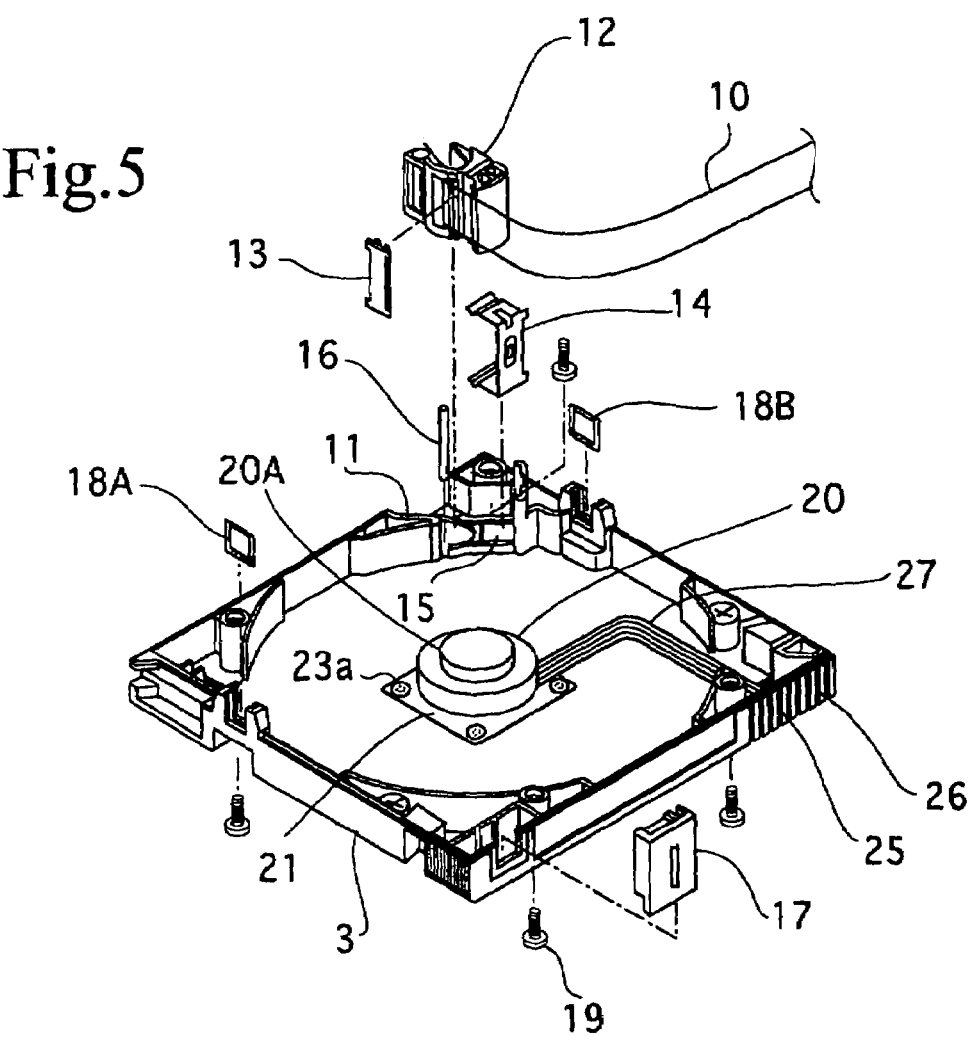
FIG. 5 is a perspective view showing a configuration of an inner part of a lower shell 3 of a tape cartridge C1.

FIG. 1 is a perspective view of the whole body of a tape cartridge C1 of the present embodiment when it is seen from the side of its upper shell 2. FIG. 2 is a perspective view of the whole body of the tape cartridge C1 when it is seen from the side of a lower shell 3. FIG. 3 is an exploded perspective view of the tape cartridge C1. FIG. 4 is a sectional side view of the principal part of the tape cartridge C1. FIG. 5 is a perspective view showing the configuration of the inner part of the lower shell 3 of the tape cartridge C1. In FIG. 4, a magnetic tape is omitted from the figure.

The tape cartridge C1 is configured to house a tape reel 6 in a cartridge case 4 rotatably. The cartridge case 4 is formed by connecting the upper shell 2 and the lower shell 3 with each other. Each of the upper shell 2 and the lower shell 3 has a shape of a shallow dish or similar thereof, and has the same height or substantially the same. Moreover, each of the upper shell 2 and the lower shell 3 is made of a synthetic resin material such as a polycarbonate resin. A magnetic tape 5 that serves as a magnetic recording medium is wound around the tape reel 6.

The tape reel 6 includes a hub 7 constituting the core portion of the magnetic tape 5, an upper flange 8 and a lower flange 9. The magnetic tape 5 is wound around the hub 7 with its magnetic surface facing inward. Alternatively, the tape reel 6 may include only the hub 7, or may be provided with only either of the upper flange 8 and the lower flange 9.

The hub 7, the upper flange 8 and the lower flange 9 may be severally made of a synthetic resin material such as a polycarbonate resin and a polystyrene resin. Alternatively, in addition to those synthetic resin materials, the hub 7, the upper flange 8 and the lower flange 9 may be severally made of a metallic material such as aluminum, titanium and magnesium, or a magnetic material such as iron and magnetic stainless steel (e.g. SUS 430).

Moreover, in the present embodiment, the hub 7 is integrally formed to be a body with the lower flange 9, and is integrated with the upper flange 8 by joining or the like. It is of course that the hub and both of the flanges 8 and 9 may be configured by means of separated members.

In the present embodiment, the lower flange 9 (and the hub 7) is made of a magnetic material. Accordingly, the magnetic field generated by a motor 20 and a wiring member 27, which will be described later, is shielded, and the magnetic tape 5 avoids magnetic influences from them.

In this case, the lower flange 9 may be formed by a blanking forming of a thin plate such as a metallic material into a disk, or by die forming. Moreover, as the magnetic material, a composite material formed by making a synthetic resin material contain a magnetic metal filler, or one made by forming a magnetic layer on the surface of the synthetic resin material may be adopted. Moreover, the wiring member 27 may be covered by a magnetic paste in place of, or in addition to, them.

At the time of nonuse of the tape cartridge C1, the magnetic tape 5 is completely wound around the tape reel 6. A transparent leader tape 10 is joined with the supply end of the magnetic tape 5.

The tip of the leader tape 10 is connected to one side face of a leader block 12 by means of a damper 13. The leader block 12 is arranged in order to block up an opening portion 11 for pulling out the tape from the inner side of the cartridge case 4. The opening portion 11 is formed at the front of the cartridge case 4 at the time when the upper shell 2 and the lower shell 3 are connected with each other.

The leader block 12 is located at a housing portion 15 (see FIG. 5) inside of the opening portion 11 while being elastically supported by a leader block spring 14 shaped in substantially a letter U.

Moreover, a cartridge tape contact prevention pin 16 is arranged to stand straight at the edge of the opening portion 11 for preventing the magnetic tape 5 pulled out from the cartridge case 4 from being contacted with the edge of the opening portion 11 directly. Thereby, the magnetic tape 5 receives the tape guiding operation of the cartridge tape contact prevention pin 16 having a shaft length longer than the tape width of the magnetic tape 5 a little, and consequently the damage owing to the contact to the butt-connected portion between the upper shell 2 and the lower shell 3 at the edge of the opening portion 11 is prevented.

Moreover, in the tape cartridge C1, a safety tab 17 for preventing the erroneous recording and the erroneous erasing of the magnetic tape 5 is provided. The safety tab 17 is slidably provided on the back surface of the cartridge case 4 on the opposite side to a surface on which the opening portion 11 is formed. Moreover, transparent window members 18A and 18B for the detection of the end of the tape is provided at side face portions of the cartridge case 4 opposed to each other in the perpendicular direction to the insertion direction to the recording and reproducing apparatus.

Next, a rotation drive mechanism of the tape reel 6 is described.

In the present embodiment, the tape reel 6 is configured to be driven to rotate by the motor 20 arranged in the inner part of the cartridge case 4. The motor 20 corresponds to the "drive apparatus" of the present invention, and is arranged between the bottom portion of the hub 7 constituting the tape reel 6 and a central part of the inner surface of the lower shell 3 constituting the cartridge case 4.

The motor 20 includes a spindle motor configured by assembling a drive coil, a rotation shaft, a magnet and the like on a motor substrate 21 integrated with the lower shell 3 in the present embodiment. As the spindle motor, for example, the so-called flat motor, which is widely applied to a recording and reproducing apparatus of a disk-shaped recording medium such as a compact disc (CD), a mini disc (MD) and a digital versatile disc (DVD), and a hard disc drive (HDD), is suitable.

Moreover, the motor substrate 21 is made of a stainless plate, an aluminum-series metal plate or the like. On the upper surface of the motor substrate 21, a printed-wiring board connected to the motor 20 is attached.

Further, the motor 20 includes a stator member formed on the printed-wiring board, and a rotor member (rotation portion) 20A provided to the stator member rotatably in both of the normal direction and the reverse direction. The rotor member 20A is fitted to a recessed portion 22 formed at the center of the recessed portion 22 of the hub 7, and is integrally connected with the hub 7 by means of an adhesive so as that the bottom portion of the hub 7 may be supported by the rotation portion 20A while the shaft center of the hub 7 and the shaft center of the rotation portion 20A are aligned with each other.

Specifically, by forming the recessed portion 22 and a rotor 22A to be a stepped form for being engaged with each other, the accuracy for positioning both of them is secured.

Moreover, the motor substrate 21 is housed in a housing recessed portion 23 formed to be locally thin at or approximately at the central part in the inner surface of the lower shell 3. The housing recessed portion 23 is formed to be a square so as to be in a fitted relation with the motor substrate 20 shaped in a square or almost square shape.

This is for preventing the motor substrate 21 supporting the motor 20 from relative movement in circumferential direction in relation to the lower shell 3 due to the reaction force of the drive force of the motor 20. It should be noted that the shape of the housing recessed portion 23 is not limited to the square shape, and that the shape may be the other geometric forms such as a polygon or an ellipse or similar shape thereto by which the motor substrate 21 can be positioned in the circumferential direction.

As long as the motor substrate can be surely integrated therein, the shape of the housing recessed portion 23 is not limited in the present embodiment, and the shape may be, for example, a circle or the like.

Shaft portions 23a inserted into through-holes 21a formed at the four corner portions of the motor substrate 21 severally are provided to stand at the four corner portions of the housing recessed portion 23. After the motor substrate 21 is attached in the housing recessed portion 23 with the shaft portions 23a being inserted into the through-holes 21a, the motor substrate 21 is integrally connected with the inner surface of the lower shell 3 by melting and by deforming the shaft portion 23a by means of a caulking jig such as a hot trowel (caulking fixation) (see FIGS. 4 and 5).

The tape cartridge C1 of the present embodiment is configured to receive a supply of a drive power of the motor 20 from a side of a recording and reproducing apparatus (not shown in the figure). Accordingly, a terminal member 25 connected to the power supply source disposed in the inner part of the recording and reproducing apparatus electrically when the tape cartridge C1 is mounted in the recording and reproducing apparatus is provided on the outer surface of the cartridge case 4.

The terminal member 25 includes, for example, a plurality of terminal portions that serve as contact points on the wiring substrate. The terminal portions are formed to be exposed to outside through a lattice window 26 formed on the back surface of the lower shell 3. The arrangement position of the terminal member 25 is not limited to the back surface of the shell, and the terminal member 25 may be arranged at, for example, a position on the lower surface of the lower shell 3 to be opposed to the motor substrate 21.

The motor 20 (or the motor substrate 21) is connected to the terminal member 25 through the wiring member 27 electrically. The wiring member 27 is formed to be pulled around in a plane along the inner plane of the lower shell 3 in order not to contact with the lower flange 9 of the tape reel 6. The wiring member 27 is arranged to be pasted onto the inner surface of the lower shell 3, but the wiring member 27 may be directly formed on the inner surface of the lower shell 3 to be patterned thereon.

In the present embodiment, not only the power supplied to the motor 20, but also drive control signals regarding a rotation direction, a rotation speed and the like are supplied from the side of a recording and reproducing apparatus through the terminal member 25 and the wiring member 27. Accordingly, tape driving with stable running may be ensured.

Alternatively, the drive power source of the motor 20 may be placed in the inner part of the cartridge case 4, and only the drive control signals may be supplied from the side of a recording and reproducing apparatus through the terminal member 25 and the wiring member 27.

Next, an example of a manufacturing method of the tape cartridge C1 of the present embodiment configured as above is described in the following section.

AS shown in FIGS. 3 and 5, the tape cartridge C1 is manufactured by assembling each of constituting parts into the inner surface of the lower shell 3.

That is to say, the motor substrate 21 supporting the motor 20 is built into the housing recessed portion 23 of the lower shell 3, and the motor substrate 21 is welded by caulking through the shaft portion 23a.

The tape reel 6, which the magnetic tape 5 is wound around and the leader block 12 is connected to, the safety tab 17 and the window members 18A and 18B are severally built into at predetermined positions. Specifically, the tape reel 6 is attached to the motor 20 by fitting the rotor member 20A of the motor 20 to the recessed portion 22 at the center of the bottom portion of the hub 7 to connect the tape reel 6 integrally with the motor 20 (see FIG. 4).

The leader block 12 is arranged in the housing portion 15, being engaged with the leader block spring 14, which has been connected with the lower shell 3 previously.

Next, the upper shell 2 and the lower shell 3 are combined with each other, and are connected to each other by means of a plurality of screw members 19.

The tape cartridge C1 of the present embodiment configured as above is mounted in the recording and reproducing apparatus at the time of its use, and the outside terminal is connected to the terminal member 25 on the outer surface of the cartridge case 4. Next, the drive power and the drive control signals of the rotation direction, the rotation speed and the like are supplied to the motor 20. On the other hand, the chucking mechanism in the recording and reproducing apparatus enters the opening portion 11 of the cartridge case 4 to be engaged with the leader block 12. Next, the magnetic tape 5 is pulled out to outside of the cartridge. The pull-out leader block 12 is guided to the winding reel of the recording and reproducing apparatus, and the magnetic tape 5 is being wound by the winding reel while recording/reproducing of an information signal at the magnetic head portion is performed.

As described above, the tape cartridge C1 of the present embodiment is configured to include the drive apparatus (motor 20), which drives the hub 7 of the tape reel 6 to rotate, in the cartridge case 4, and enables the self running of the magnetic tape 5 by the cartridge itself. Consequently, in the recording and reproducing apparatus, the reel driving shaft for driving the tape reel 6 to rotate is not required. All the recording and reproducing apparatus has to do is to supply the drive power and the drive control signals to the motor 20 through the terminal member 25 and the wiring member 27.

Consequently, according to the present embodiment, a mechanism for the rotation drive of the tape reel 6 is provided independently in the inner part of the cartridge. Hence, the shaft vibrations of the hub 7 and the surface vibrations and the circumference vibrations of the flanges 8 and 9, all resulted from the variants of the relative positions of the side of the tape cartridge and the side of the recording and reproducing apparatus, and the engagement variants of the rotation driving force transmitting system can be removed. Consequently, the smooth and stable high speed running performance of the magnetic tape 5 may be secured, thereby realizing the high speed access.

Moreover, because the tape reel may be designed without considering the shaft vibrations of the hub 7 and the surface vibrations and the circumference vibrations of the flanges 8 and 9, all resulted from the variants of the relative positions of the side of the tape cartridge and the side of the recording and reproducing apparatus, and the engagement variants of the rotation driving force transmitting system, the outside diameter of the reel can be increased in comparison with the diameter of a tape cartridge of related art having the same size. Consequently, the higher the storage capacity may be achieved by expanding the winding diameter of the magnetic tape 5 to the maximum degree.

Specifically, because the motor 20 that serves as the drive apparatus is arranged between the bottom portion of the hub 7 and the lower shell 3, the perpendicularity of the hub 7 to the lower shell 3 and the parallelism of the flanges 8 and 9 to the lower shell 3 are secured, and consequently the stabilization of the rotation posture of the tape reel 6 may be achieved; and the high reliability in the higher tape running speed may be secured.

Moreover, because the motor 20 that serves as the drive apparatus includes a flat spindle motor, the drive apparatus may be made in a smaller size, thereby enabling to contribute to the flattening of the cartridge.

Moreover, because the hub 7 and lower flange 9 of the tape reel 6 are made of the magnetic material, the magnetic fields generated by the motor 20 and the wiring member 27 can be shielded, and the magnetic influence to the magnetic tape 5 wound around the hub 7 may be avoided.

Further, because the tape cartridge C1 is configure to be able to run the magnetic tape by the tape cartridge C1 itself, and because it is unnecessary to dispose a reel rotation drive mechanism on the side of the recording and reproducing apparatus, the compatibility of operation may be easily supported even if different types and sizes of cartridges are used.

Second Embodiment

Figure 6:
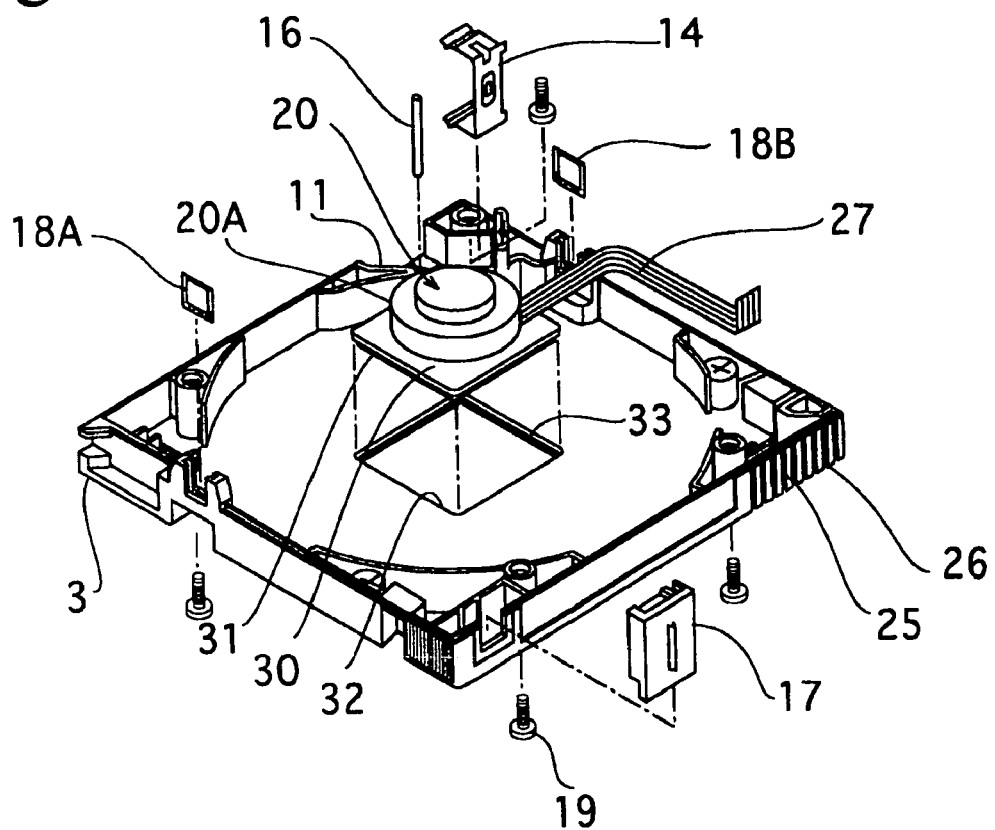
FIG. 6 is a perspective view showing a configuration of an inner part of a lower shell 3 of a tape cartridge C2 of a second embodiment of the present invention.
Figure 7:
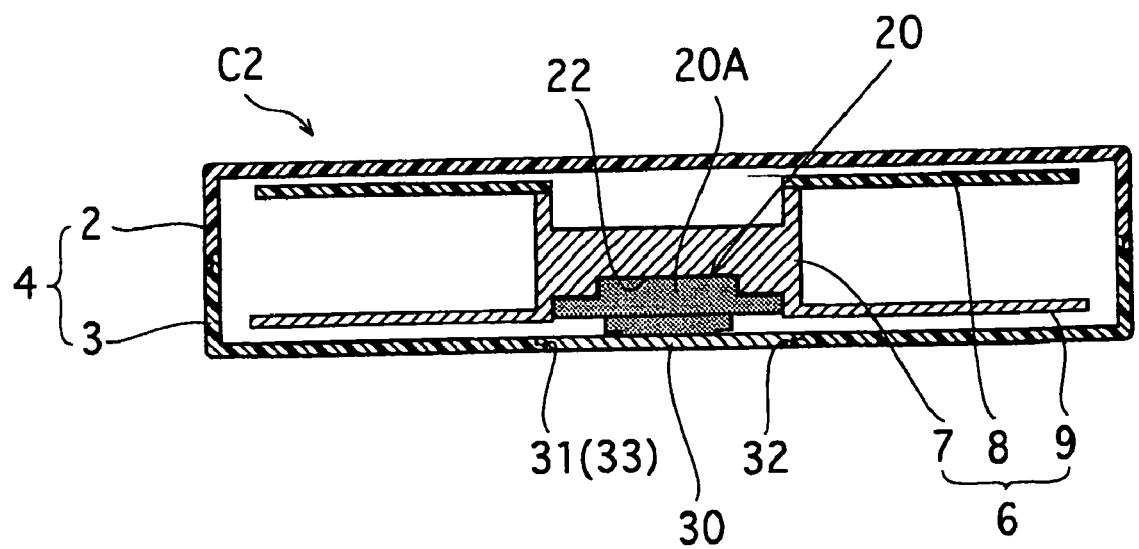
FIG. 7 is a sectional side view of a tape cartridge C2.

FIGS. 6 and 7 show a second embodiment of the present invention.

Hereupon, FIG. 6 is a perspective view showing a configuration of an inner part of a lower shell 3 of a tape cartridge C2 of the present embodiment, and FIG. 7 is a sectional side view of the principal part of the tape cartridge C2. In FIG. 7, a magnetic tape is omitted from the figure. In the drawings, parts corresponding to those of the first embodiment are denoted by the same reference marks as those in the preceding drawings, and their detailed description are omitted.

The tape cartridge C2 of the present embodiment is different from the first embodiment in connecting mechanism of a motor substrate 30 supporting the motor 20 and the lower shell 3, which is connected with the motor substrate 30.

That is to say, in the present embodiment, an opening 32 for housing the motor substrate 30 is formed at or almost the central part of the lower shell 3. The shape of the opening 32 is formed to be one corresponding to the shape of the motor substrate 30. In the present embodiment, the shape is equal to or almost a square. Consequently, the position displacement of the motor substrate 30 in relation to the lower shell 3 due to the rotation force generated at the drive of the motor 20 may be prevented.

The opening edge of the opening 32 and the peripheral edge of the motor substrate 30 are severally shaped in a step form. Each of the step portions 33 and 31 of the step form is engaged with each other, and configured so as that the motor substrate 30 does not slip out from the lower surface of the lower shell 3 to the outside.

The motor substrate 30 has a thickness equal to or approximately equal to the thickness of the bottom portion of the lower shell 3. When the motor substrate 39 is mounted in the opening 32, the opening 32 is blocked, and the upper and the lower surfaces of the motor substrate 30 coincide with the inner and the outer surfaces of the bottom portion of the lower shell 3, respectively. That is to say, when the motor substrate 30 is mounted in the opening 32, the motor substrate 30 becomes a part of the lower shell 3.

As a connecting method of the motor substrate 30 with the opening 32, an insert molding method is adopted in the present embodiment. Consequently, the motor substrate 30 is integrally connected with the opening 32 at the same time as the molding of the lower shell 3. Alternatively, the opening 32 and the motor substrate 30 may be connected with each other by means of the other methods such as adhesion and welding.

After the connection of the lower shell 3 and the motor substrate 30, the motor 20 is manufactured by attaching a drive coil, a rotation shaft, a magnet and the like on the motor substrate 30.

According to the tape cartridge C2 of the present embodiment configured as above, the effects similar to those of the above-mentioned first embodiment may be obtained.

In particular, according to the present embodiment, because the motor substrate 30 is configured to form a part of the lower shell 3, the degree of freedom of the thickness of the motor 20 increases in comparison with that of the above-mentioned first embodiment, and the cartridge may be made to be thinner.

Moreover, because the present embodiment is configured so as that the motor substrate 30 may be exposed to outside from the lower surface of the lower shell 3, the heat generated at the time of the drive of the motor 20 may be efficiently radiated to the outside through the motor substrate 30 by configuring the motor substrate 30 with a metallic material, and a rise of the temperature of the inner part of the cartridge case 4 may be suppressed and enable to provide protection of the magnetic tape 5.

Third Embodiment

Figure 8:
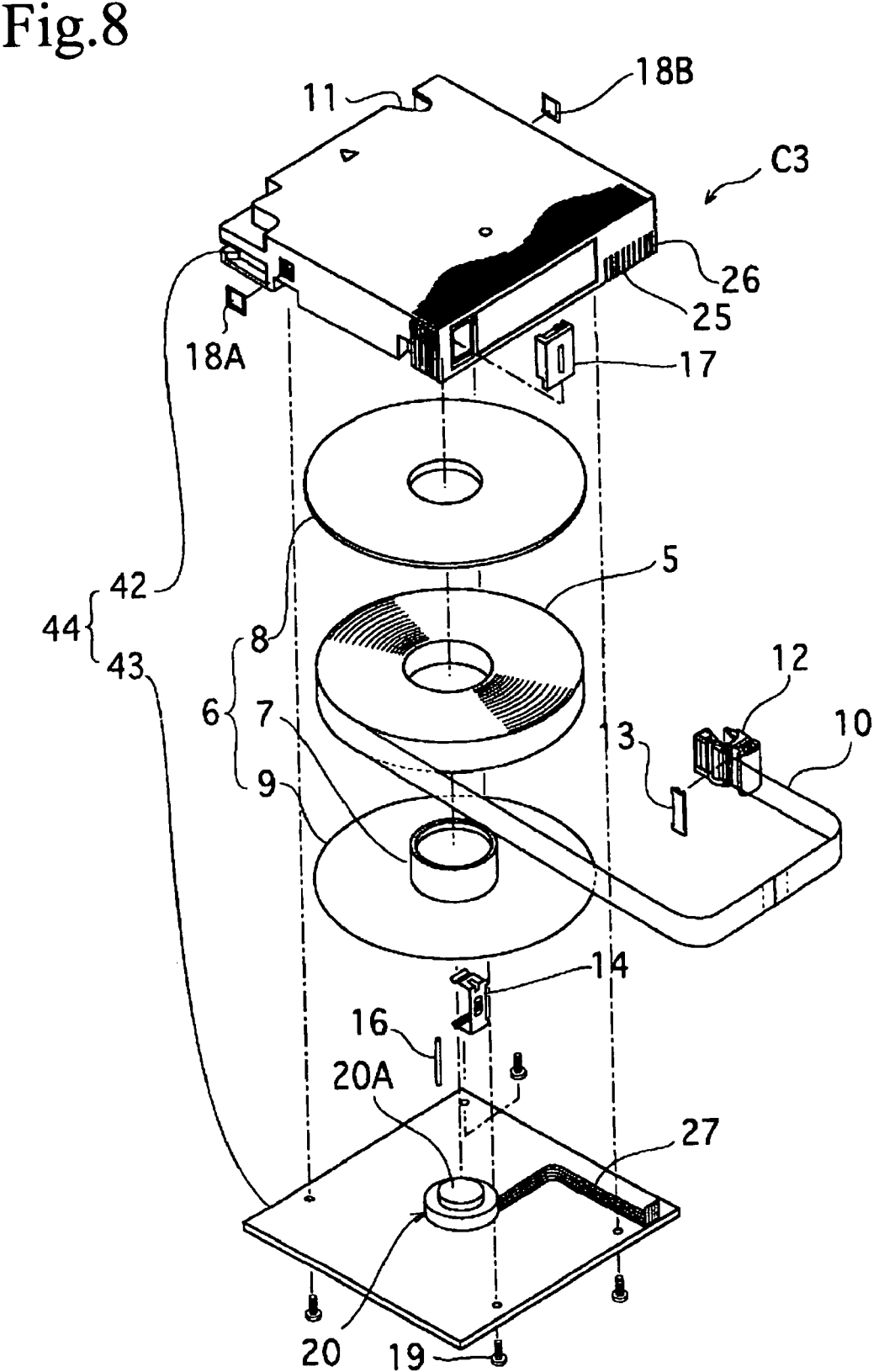
FIG. 8 is an exploded perspective view of a tape cartridge C3 according to a third embodiment of the present invention.
Figure 9:
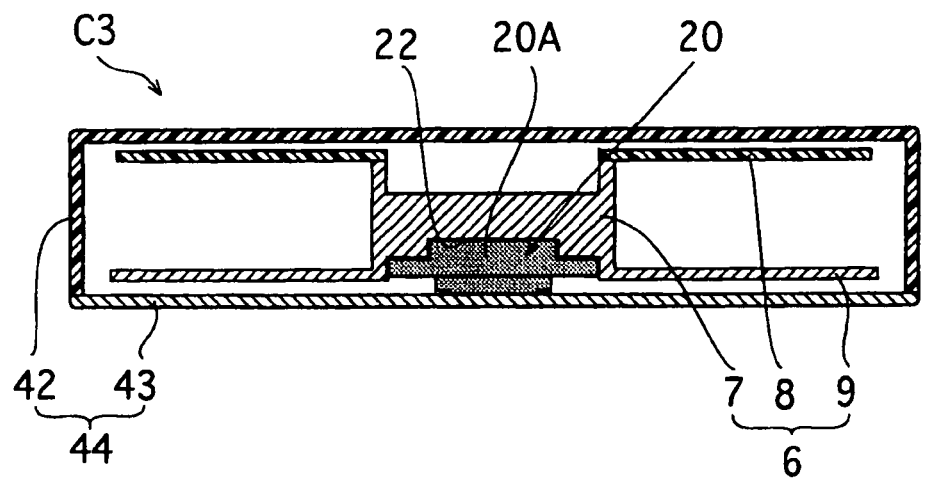
FIG. 9 is a sectional side view of a tape cartridge C3.

FIGS. 8 and 9 show a third embodiment of the present invention. Hereupon, FIG. 8 is an exploded perspective view of a tape cartridge C3 of the present embodiment, and FIG. 9 is a sectional side view of the principal part of the tape cartridge C3. In FIG. 9, the magnetic tape is omitted to be shown. Parts corresponding to those of the above-mentioned first embodiment are denoted by the same reference marks as those of the first embodiment in the drawings, and their detailed description are omitted.

A cartridge case 44 of the tape cartridge C3 of the present embodiment is formed by connecting a shallow dish-shaped cartridge main body 42 and a flat plate-shaped motor substrate 43 supporting the motor 20 to each other.

The cartridge main body 42 is made of a synthetic resin material such as a polycarbonate resin. The motor substrate 43 is formed to have the same size as that of the outer shape of the cartridge main body 42, and blocks the cartridge main body 42. The cartridge case 44 is configured by means of a plurality of screw members 19.

The motor substrate 43 is made of a metallic material such as an aluminum group metal and stainless, and may be formed by stamping, for example. Next, on the upper surface of the obtained motor substrate 43, a drive coil, a rotation shaft, a magnet and the like are attached to manufacture the motor 20.

The motor substrate 30 is not limited to be made of a metal. The motor substrate 30 may be made of a synthetic resin material such as polycarbonate, or of a composite material formed by filling a synthetic resin material of this kind with fiber, metallic powder or the like. Moreover, as shaping methods, a stamping method, an injection molding method or the like may be adopted.

According to the tape cartridge C3 of the present embodiment configured as above, the effects similar to those of the above-mentioned first embodiment may be obtained.

In particular, according to the present embodiment, because the embodiment is configured to use the motor substrate 43 that serves also as the bottom wall surface of the cartridge case 44, the degree of freedom on the thickness of the motor 20 and the degree of freedom on the assembly of the motor 20 may be improved, and an accurate cartridge case 44 may be realized.

Moreover, because the embodiment is configured to use the motor substrate 43 also as the bottom wall surface of the cartridge case 44, the heat generated at the time of the drive of the motor 20 may be efficiently radiated to outside through the motor substrate 43 having a large surface area, and consequently the rise of the temperature in the inner part of the cartridge case 44 may be further suppressed.

In the above, the embodiments of the present invention has been described. It is of course that the present invention is not limited to those embodiments. Various modifications based on the technical idea of the present invention may be made.

For example, the examples in which the present invention is applied to the magnetic tape cartridges of the single reel type has been described in the above embodiments, but the present invention is not limited to those examples. The present invention may be also applied to a magnetic tape cartridge in a bi-reel type, which houses a supply reel and a winding reel in a cartridge case.

Figure 10:
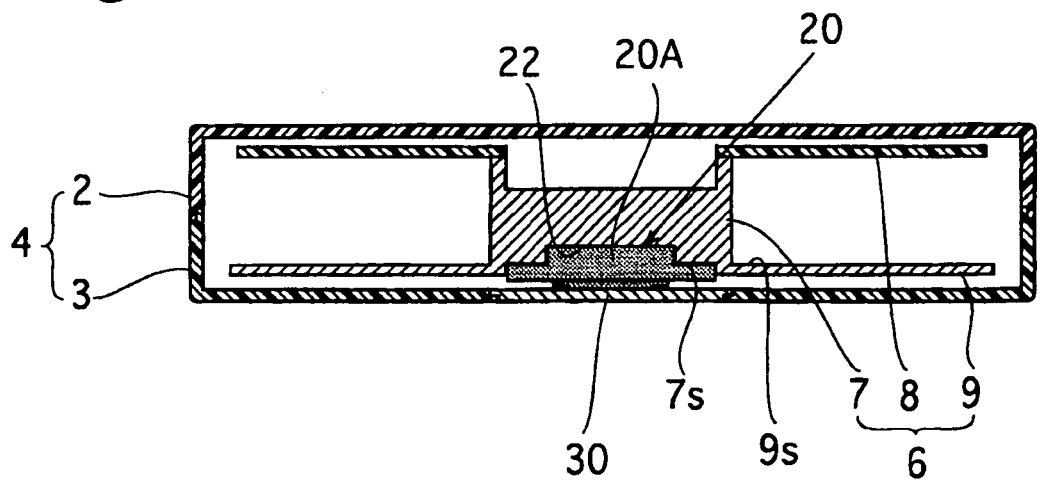
FIG. 10 is a sectional side view of a tape cartridge for illustrating a variation of the embodiments of the present invention.
Figure 11:
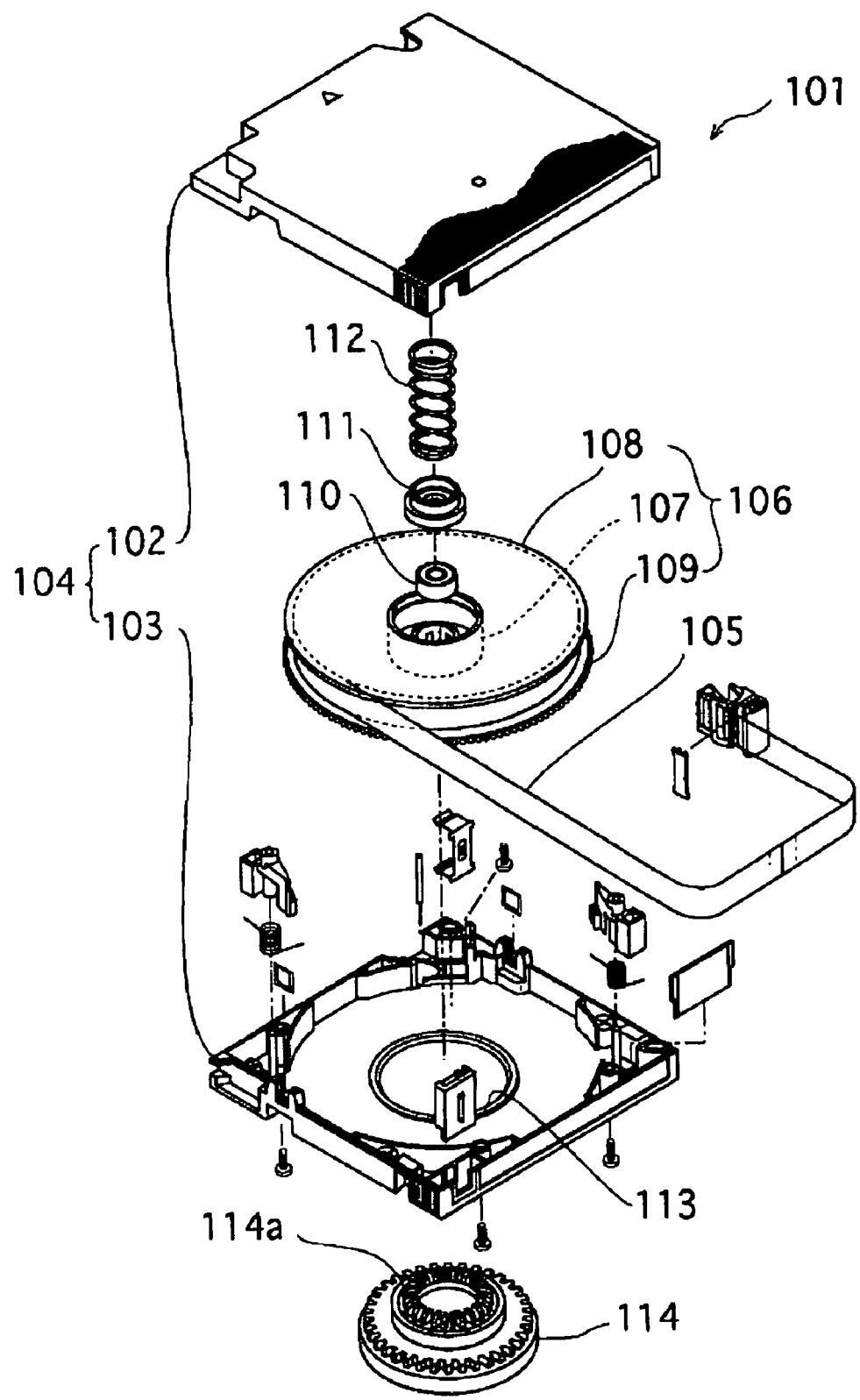
FIG. 11 is an exploded perspective view of a tape cartridge of related art.

Moreover, in each of the above embodiments, the inner surface of the lower flange 9 of the tape reel 6 and the bottom portion of the hub 7 supported by the motor 20 are severally provided at a position having a height different from each other (see FIGS. 4, 7 and 9). However, when the hub 7 and the lower flange 9 are made of synthetic resin material as their main substance, it is preferable that the inner surface 9s of the lower flange 9 and the bottom portion 7s of the hub 7 are located at or almost the same height position severally, as shown in FIG. 10. Consequently, the deformation of the peripheral surface of the hub 7 caused by the difference of the thermal shrinkage between the motor 20 and the hub 7 (lower flange 9) may be suppressed, and the configuration is particularly effective to the protection of the edge of a tape.

The configurations and structures of respective elements shown in the above description in best mode are only exemplary shown to embody the present invention and shall be interpreted not in a limiting sense.

What is claimed is:

1. A tape cartridge comprising:
   a cartridge case comprised of two main opposing surfaces and one or more side surfaces that connect the two main opposing surfaces, each side surface having a width smaller than the width of either of the two main opposing surfaces;
   a hub, around which a magnetic tape may be wound around, is housed in the cartridge case in a manner so as to be capable of being rotated; and
   a drive apparatus for driving the hub to rotate, the drive apparatus having a motor substrate secured directly to an interior side portion of one of said main opposing surfaces of the cartridge case.

2. The tape cartridge according to claim 1, further comprising:
   a terminal member, disposed on an external surface of a side surface of the cartridge case, for supplying electric power and/or a drive control signal for driving the drive apparatus.

3. The tape cartridge according to claim 2, further comprising:
   a wiring member, disposed inside the cartridge case, for connecting the drive apparatus and the terminal member.

4. The tape cartridge according to claim 1, wherein:
   the motor substrate is integrally connected with the cartridge case, and
   the drive apparatus further includes a motor supported by the motor substrate,
   wherein a rotation portion of the motor is integrally connected at a center of the bottom portion of the hub.

5. The tape cartridge according to claim 4, further comprising:
   a housing recessed portion, formed in an internal surface of the main opposing surface of the cartridge case as said motor substrate is secured, the recessed portion housing the motor substrate.

6. The tape cartridge according to claim 5, wherein:
   the motor substrate and the housing recessed portion have forms capable of preventing a relative shift in a circumferential direction due to a reaction force of drive force of the motor.

7. The tape cartridge according to claim 4, wherein:
   the motor substrate forms a a portion of the main opposing surface of the cartridge case that the motor substrate is secured to.

8. The tape cartridge according to claim 4, wherein:
   the motor substrate is a molded structure secured to the cartridge case.

9. The tape cartridge according to claim 4, wherein:
   the motor substrate is a made of metal, and functions to disperse heat generated by the drive apparatus.

10. The tape cartridge according to claim 9, wherein:
    the motor substrate is a made of stainless steel or aluminum.

11. The tape cartridge according to claim 1, further comprising:
    a flange formed to extend to outside of a diameter at least in an edge part of the bottom portion of the hub, the flange being comprised of magnetic material which at least partially shields the magnetic tape from magnetic fields generated by the drive apparatus.

12. The tape cartridge according to claim 1, further comprising:
    a flange formed to extend to outside of a diameter in an edge part of the bottom portion of the hub, the flange being configured such that an inner surface of the flange has an equal or substantially equal height of the bottom portion of the hub.

13. The tape cartridge according to claim 1, further comprising:
    an opening formed in a portion of the cartridge case of sufficient size to allow the magnetic tape to pass outside of the cartridge case.

14. The tape cartridge according to claim 1, further comprising:
    a printed wiring board formed over said motor substrate.

15. A tape cartridge comprising:
    a cartridge case;
    a hub, around which a magnetic tape may be wound around, is housed in the cartridge case in a manner so as to be capable of being rotated; and
    a drive apparatus for driving the hub to rotate, the drive apparatus having a metal motor substrate secured to interior side of a main side wall of the cartridge case in order to disperse heat generated by the drive apparatus.

16. The tape cartridge according to claim 15, wherein:
    the motor substrate is a made of stainless steel or aluminum.

17. The tape cartridge according to claim 15, further comprising:
    a printed wiring board formed over said motor substrate.

18. A tape cartridge comprising:
    a cartridge case;
    a hub, around which a magnetic tape may be wound around, is housed in the cartridge case in a manner so as to be capable of being rotated;
    a drive apparatus for driving the hub to rotate, the drive apparatus having a motor substrate secured to interior side of a main side wall of the cartridge, and
    an opening formed in a portion of the cartridge case of sufficient size to allow the magnetic tape to pass outside of the cartridge case.

19. The tape cartridge according to claim 18, further comprising:
    a printed wiring board formed over said motor substrate.

20. The tape cartridge according to claim 18, further comprising:
    a cartridge tape contact prevention pin arranged adjacent the opening for preventing the magnetic tape from contacting an edge of the opening.

* * * * *